Patented Jan. 10, 1933

1,894,126

UNITED STATES PATENT OFFICE

OTTO SCHMIDT, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF CARBON BLACK

No Drawing. Application filed December 26, 1928, Serial No. 328,614, and in Germany January 21, 1928.

This invention relates to improvements in the manufacture and production of carbon black.

I have found that a high grade carbon black is obtained by treating carbon monoxide or a gas containing it under pressure at a low to moderately elevated temperature in the presence of catalysts which are solid under the conditions of working and which comprise elements or compounds of the iron group, namely cobalt, nickel or iron in the solid state, in conjunction with activating additions as herein defined. Such activating additions are metal oxides or hydroxides, othen than those of the iron group such as manganous oxide, vanadium oxide, chromic oxide, uranium oxide, zinc oxide, alumina, cadmium oxide, copper oxide and the like, oxides of the alkaline earths and the like, also salts, such as silicates, chromates, molybdates, tungstates and the like. The metals of the iron group employed are preferably obtained by reducing their oxides. The catalysts may be used either in a finely divided state, when desired in conjunction with carriers, or in the form of lumps, chips, turnings, screens, wire gauze, and the like. Under certain circumstances, the walls of the vessel itself exert a catalytic action. It is often advisable to take care to remove the carbon formed during the decomposition as quickly as possible from the reaction vessel. This is most easily effected by mechanical means, and the removal may also be effected by maintaining a high gas velocity in the reaction zone. Good carbon black may, however, also be produced without these precautionary measures.

In my said process temperatures of between about 25° to 800° C. or even higher are usually employed. I prefer to operate at temperatures of between about 100° and 450° C., and usually of between about 300° and 400° C. As pressures I employ any pressure higher than atmospheric pressure, but I usually employ pressures of between about 30 and 250 atmospheres and preferably of about 100 to 200 atmospheres.

I have further found that, by reason of its high state of dispersion, the carbon black produced by the decomposition of carbon monoxide, especially according to the process of the present invention is adapted for the production of colored compositions, such as printing inks, endorsing inks and the like, and also for use in the rubber industry, for example, in the vulcanization process for the production of rubber articles, both from rubber and from the plastic resilient polymerization products of the diolefine hydrocarbons.

Since the carbon black prepared in this manner is far more easily and conveniently obtainable than that hitherto prepared by partial combustion of hydrocarbons, its application for the said purposes constitutes a substantial technical improvement.

The following example further illustrates the nature of this invention, which, however, is not restricted thereto.

*Example*

Carbon monoxide, under a pressure of 200 atmospheres and at a temperature of about 400° C., is passed over a catalyst prepared by depositing nickel on kieselguhr. The decomposition of the carbon monoxide is accompanied with violent evolution of heat, carbon and carbon dioxide being formed. Care is taken, by cooling, to prevent the temperature from rising substantially above 450° C. The carbon is deposited in the form of a very fine carbon black, which contains only traces of nickel. Under these conditions, the conversion of carbon monoxide into carbon proceeds in an almost quantitative manner, so that the residual gas is almost exclusively carbon dioxide. This carbon black is directly suitable for many purposes. The procedure is similar when gases consisting of mixtures of carbon monoxide and other gases are employed.

Very advantageous results are also obtained if in the above example, a catalyst is employed, which has been prepared by reducing a mixture of 99 parts of cobalt oxide with 1 part of zinc oxide (obtained by precipitation of a solution of a mixture of the nitrates) which has been pressed into forms.

What I claim is:

1. A process for the production of carbon black from a gas containing carbon monoxide, which comprises treating the said initial material under pressure and at a low to moderately elevated temperature in the presence of a catalyst, which is solid under the conditions of working and which contains at least one constituent comprising a metal from the iron group in admixture with at least one activating addition.

2. A process for the production of carbon black from a gas containing carbon monoxide, which comprises treating the said inital material under pressure and at a temperature of between about 25° to 800° C. in the presence of a catalyst, which is solid under the conditions of working and which contains at least one constituent comprising a metal from the iron group in admixture with at least one activating addition.

3. A process for the production of carbon black from a gas containing carbon monoxide, which comprises passing the said initial material under pressure and at a temperature of between about 25° to 800° C. over a catalyst which is solid under the conditions of working and which contains at least one constituent comprising a metal from the iron group in admixture with at least one activating addition.

4. A process for the production of carbon black from a gas containing carbon monoxide, which comprises passing the said initial material under pressure and at a temperature of between about 100° to 450° C. over a catalyst, which is solid under the conditions of working and which contains at least one constituent comprising a metal from the iron group in admixture with at least one activating addition.

5. A process for the production of carbon black from a gas containing carbon monoxide, which comprises passing the said initial material under a pressure of between about 30 and 250 atmospheres and at a temperature of between about 25° to 800° C. over a catalyst, which is solid under the conditions of working and which contains at least one constituent comprising a metal from the iron group in admixture with at least one activating addition.

6. A process for the production of carbon black from a gas containing carbon monoxide, which comprises passing the said initial material under a pressure of between about 30 and 250 atmospheres and at a temperature of between about 100° to 450° C. over a catalyst, which is solid under the conditions of working and which contains at least one constituent comprising a metal from the iron group in admixture with at least one activating addition.

7. A process for the production of carbon black from carbon monoxide, which comprises passing the said initial material under a pressure of between about 30 and 250 atmospheres and at a temperature of between about 25° to 800° C. over a catalyst, which is solid under the conditions of working and which contains at least one constituent comprising a metal from the iron group in admixture with at least one activating addition.

8. A process for the production of carbon black from carbon monoxide, which comprises passing the said initial material under a pressure of between about 30 and 250 atmospheres and at a temperature of between about 100° to 450° C. over a catalyst, which is solid under the conditions of working and which contains at least one constituent comprising a metal from the iron group in admixture with at least one activating addition.

9. A process for the production of carbon black from carbon monoxide, which comprises passing the said initial material in admixture with an extraneous gas under a pressure of between about 30 and 250 atmospheres and at a temperature of between about 25° to 800° C. over a catalyst, which is solid under the conditions of working, and which contains at least one constituent comprising a metal from the iron group in admixture with at least one activating addition.

10. A process for the production of carbon black from carbon monoxide, which comprises passing the said initial material in admixture with an extraneous gas under a pressure of between about 30 and 250 atmospheres and at a temperature of between about 100° to 450° C. over a catalyst, which is solid under the conditions of working, and which contains at least one constituent comprising a metal from the iron group in admixture with at least one activating addition.

11. A process for the production of carbon black from carbon monoxide, which comprises passing the said initial material under a pressure of between about 30 and 250 atmospheres and at a temperature of between 25° to 800° C. over a catalyst, which is solid under the conditions of working, and comprising cobalt in admixture with at least one activating addition.

12. A process for the production of carbon black from carbon monoxide, which comprises passing the said initial material under a pressure of between about 30 and 250 atmospheres and at a temperature of between about 100° to 450° C. over a catalyst, which is solid under the conditions of working, and comprising cobalt in admixture with at least one activating addition.

13. A process for the production of carbon black by passing carbon monoxide at a temperature of about 400° C. under a pressure of about 200 atmospheres over a solid catalyst comprising cobalt in admixture with at least one activating addition.

14. A process for the production of carbon black from carbon monoxide, which comprises passing the said initial material under a pressure of between about 30 and 250 atmospheres and at a temperature of between about 25° to 800° C. over a catalyst, which is solid under the conditions of working and which contains at least one constituent comprising a metal from the iron group in admixture with zinc oxide.

15. A process for the production of carbon black from carbon monoxide, which comprises passing the said initial material under a pressure of between about 30 and 250 atmospheres and at a temperature of between about 25° to 800° C. over a catalyst, which is solid under the conditions of working and which contains at least one constituent comprising a metal from the iron group in admixture with alumina.

16. A process for the production of carbon black from carbon monoxide, which comprises passing the said initial material under a pressure of between about 30 and 250 atmospheres and at a temperature of between about 25° to 800° C. over a catalyst, which is solid under the conditions of working and which contains at least one constituent comprising a metal from the iron group in admixture with an oxide of an alkaline earth metal.

17. The process of producing carbon which consists in subjecting carbon monoxide to thermal decomposition in the presence of a catalyst containing an iron group metal and an oxide of an alkali-forming metal.

In testimony whereof I have hereunto set my hand.

OTTO SCHMIDT.